(12) United States Patent
Sanches et al.

(10) Patent No.: US 11,625,560 B2
(45) Date of Patent: Apr. 11, 2023

(54) SERVER AND CONTROL METHOD THEREOF

(71) Applicant: SAMSUNG ELECTRONICS CO., LTD., Suwon-si (KR)

(72) Inventors: Ernesto Sanches, Suwon-si (KR); Ja Yoon Koo, Suwon-si (KR); Vivek Agarwal, Suwon-si (KR); Jatin Garg, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 357 days.

(21) Appl. No.: 16/765,655

(22) PCT Filed: Nov. 12, 2018

(86) PCT No.: PCT/KR2018/013743
§ 371 (c)(1),
(2) Date: May 20, 2020

(87) PCT Pub. No.: WO2019/107796
PCT Pub. Date: Jun. 6, 2019

(65) Prior Publication Data
US 2020/0302242 A1    Sep. 24, 2020

(30) Foreign Application Priority Data
Nov. 28, 2017 (KR) .................. 10-2017-0160209

(51) Int. Cl.
*G06F 16/732* (2019.01)
*G06K 9/62* (2022.01)
*G06N 20/00* (2019.01)

(52) U.S. Cl.
CPC ....... *G06K 9/6267* (2013.01); *G06F 16/7335* (2019.01); *G06N 20/00* (2019.01)

(58) Field of Classification Search
CPC .................................................. G06F 16/7335
See application file for complete search history.

(56) References Cited

U.S. PATENT DOCUMENTS

| 8,793,274 B2 | 7/2014 | Yu et al. |
| 9,146,990 B2 | 9/2015 | Scherf et al. |
| (Continued) | | |

FOREIGN PATENT DOCUMENTS

| KR | 10-2013-0046011 | 5/2013 |
| KR | 10-2013-0122262 | 11/2013 |
| (Continued) | | |

OTHER PUBLICATIONS

International Search Report for PCT/KR2018/013743, dated Mar. 15, 2019, 4 pages.
(Continued)

*Primary Examiner* — Richard L Bowen
(74) *Attorney, Agent, or Firm* — Nixon & Vanderhye, P.C.

(57) ABSTRACT

A server and a control method thereof are provided. The server includes a communicator configured to communicate with an external apparatus; and a processor configured to: receive an image from the external apparatus via the communicator, process the received image by applying a plurality of image analysis models of which an analysis type for the image is different from each other, to the received image, and generate analysis result information about the image respectively corresponding to a plurality of analysis types according to the processing of the received image. With this, more various types of image analysis information may be provided with respect to one image. At least a portion of the analysis of the image, the processing and the generation may be carried out using at least one of a machine learning, a
(Continued)

nerve network or a deep learning algorithm as a rule based or artificial intelligence algorithm.

13 Claims, 13 Drawing Sheets

(56) References Cited

U.S. PATENT DOCUMENTS

| | | | |
|---|---|---|---|
| 2005/0276477 A1* | 12/2005 | Lin | G06T 11/60 |
| | | | 382/173 |
| 2011/0222754 A1* | 9/2011 | Zhao | G06T 7/0004 |
| | | | 382/141 |
| 2011/0289114 A1 | 11/2011 | Yu et al. | |
| 2012/0166211 A1* | 6/2012 | Park | G16H 50/20 |
| | | | 705/2 |
| 2013/0198187 A1 | 8/2013 | Botros | |
| 2014/0193027 A1 | 7/2014 | Scherf et al. | |
| 2015/0256905 A1 | 9/2015 | Lee et al. | |
| 2016/0042249 A1* | 2/2016 | Babenko | G06V 20/46 |
| | | | 382/224 |
| 2017/0064345 A1 | 3/2017 | Cai et al. | |
| 2017/0300781 A1* | 10/2017 | Lehrmann | G06K 9/6219 |
| 2017/0330264 A1 | 11/2017 | Youssef et al. | |
| 2018/0053068 A1* | 2/2018 | Anglin | G06V 10/462 |
| 2018/0322627 A1* | 11/2018 | Gerard | A61B 8/54 |
| 2020/0327326 A1* | 10/2020 | Gavish | G06V 20/60 |

FOREIGN PATENT DOCUMENTS

| | | |
|---|---|---|
| KR | 10-2014-0092152 | 7/2014 |
| KR | 10-1791924 | 11/2017 |

OTHER PUBLICATIONS

Written Opinion of the ISA for PCT/KR2018/013743, dated Mar. 15, 2019, 7 pages.

Office Action dated Nov. 19, 2021 in Korean Patent Application No. 10-2017-0160209 and partial English-language translation.

* cited by examiner

SERVER AND CONTROL METHOD THEREOF

This application is the U.S. national phase of International Application No. PCT/KR2018/013743 filed 12 Nov. 2018, which designated the U.S. and claims priority to KR Patent Application No. 10-2017-0160209 filed 28 Nov. 2017, the entire contents of each of which are hereby incorporated by reference.

BACKGROUND

1. Field

Apparatuses consistent with embodiments relate to a server and a method thereof, and more particularly, a server, which carries out a processing based on an image analysis, and a control method thereof.

2. Description of Related Art

An artificial intelligence (AI) system is a computer system, which embodies a human level intelligence and which learns, judges and grows smart by itself different from an existing rule based smart system. The more the AI system is used, the more the recognition rate and the understanding ability for user's preference thereof are improved. Thus, the existing rule based smart system is being gradually replaced by a deep learning based AI system.

The AI technology consists of a machine learning (deep learning) technology and an element technology using the machine learning.

The machine learning is an algorithm technology, which classifies/learns characteristics of input data by itself. The element technology is a technology of imitating functions, such as cognition, judgment or the like, of human brain using a machine learning algorithm, such as the deep learning or the like, and consists of various technical fields including linguistic comprehension, visual comprehension, inference/prediction, knowledge representation, operation control, etc.

The various fields in which the AI technology is applied are as follows. The linguistic comprehension is a technology of recognizing and applying/processing human languages/letters, and includes natural language processing, machine translation, dialogue system, question and answer, voice recognition/synthesis, etc. The visual comprehension is a technology of recognizing and processing things as in human eye, and includes object recognition, object tracking, image search, human perception, scene understanding, space understanding, image enhancement, etc. The inference/prediction is a technology of judging and logically inferencing/predicting information, and includes knowledge/provability based inference, optimization prediction, preference based planning, recommendation, etc. The knowledge representation is a technology of automated-processing human experience information with knowledge data, and includes knowledge construction (data generation/classification), knowledge management, etc. The control operation is a technology of controlling automatic driving of vehicles and movement of robots, and includes movement control (navigation, collision, driving), operation control (behavioral control), etc.

SUMMARY

Embodiments provide a server or the like, which provides more various types of services with respect to an image.

According to an embodiment, a server includes: a communicator configured to communicate with an external apparatus; and a processor configured to: receive an image from the external apparatus via the communicator, process the received image by applying a plurality of image analysis models of which an analysis type for the image is different from each other, to the received image, and generate analysis result information about the image respectively corresponding to a plurality of analysis types according to the processing of the received image.

With this, various types of image analysis information may be provided with respect to one image.

The server may further include a plurality of image receivers, each of which is configured to receive an image, and the processor may be configured to receive a plurality of images via the plurality of image receivers, and process the plurality of received images by applying the plurality of image analysis models of which the analysis type is different from each other, to each of the plurality of received images.

Accordingly, the various types of image analysis information may also be provided even with respect to the plurality of images.

The processor may be configured to classify images received via the communicator according to kinds, and process the classified images by applying the plurality of image analysis models of which the analysis type is different from each other, to each of the images classified according to kinds.

Accordingly, a reliability in the various types of image analysis information provided with respect to the images may be increased.

The processor may be configured to identify more than two image analysis models to be applied to the received image from among the plurality of image analysis models of which the analysis type is different from each other, based on the received image, and apply the identified more than two image analysis models to the received image.

Accordingly, when providing the various types of image analysis information with respect to the image, image analysis information useful as well as appropriate for the image may be effectively provided.

According to another embodiment, a server includes: a communicator configured to communicate with an external apparatus; and a storage configured to store analysis result information about at least one image corresponding to an analysis type of at least one image analysis model with respect to the at least one image; and a processor configured to: receive an inquiry about an image from the external apparatus via the communicator; identify an analysis type of an image analysis model corresponding to the inquiry about the image; based on the analysis result information about the at least one image stored in the storage, identify or generate a search result corresponding to the identified analysis type and the inquiry; and transmit the search result to the external apparatus.

With this, even though the user freely enters the inquiry without limiting to a specific type of information with respect to the image, information about the image that meets the user's request may be provided.

The processor may be configured to receive the inquiry from a plurality of external apparatuses via the communicator, and transmit the generated search result to each of the plurality of external apparatuses.

Accordingly, various types of image analysis information about the image may be provided to the plurality of external apparatuses.

According to further another exemplary, a display apparatus include: a display; a user input; a communicator configured to communicate with an external apparatus; and a processor configured to: receive an inquiry about an image including a content about an analysis type of an image analysis model from the external apparatus via the communicator, transmit the inquiry to the external apparatus, receive, from the external apparatus, a search result identified or generated based on analysis result information about the image and corresponding to the analysis type included in the inquiry, and control the display to display the received search result.

The processor may be configured to transmit information about the analysis type of the image analysis model corresponding to the inquiry about the image, to the external apparatus.

According to still another exemplary, a control method of a server includes: receiving an image from an external apparatus; processing the received image by applying a plurality of image analysis models of which an analysis type for the image is different from each other, to the received image, and generating analysis result information about the image respectively corresponding to a plurality of analysis types according to the processing of the received image.

With this, various types of image analysis information may be provided with respect to one image.

The server may include a plurality of image receivers, each of which is configured to receive an image, and the receiving may include receiving a plurality of images via the plurality of image receivers, respectively and the processing may include processing the plurality of received images by applying the plurality of image analysis models of which the analysis type is different from each other, to each of the plurality of received images.

Accordingly, the various types of image analysis information may also be provided even with respect to the plurality of images.

The method may further include classifying images received via the communicator according to kinds, and the processing may include processing the received images by applying the plurality of image analysis models of which the analysis type is different from each other, to each of the images classified according to kinds.

Accordingly, a reliability in the various types of image analysis information provided with respect to the images may be increased.

The method may further include identifying more than two image analysis models to be applied to the received image from among the plurality of image analysis models of which the analysis type is different from each other, based on the received image, and the processing may include applying the identified more than two image analysis models to the received image.

Accordingly, when providing the various types of image analysis information with respect to the image, image analysis information useful as well as appropriate for the image may be effectively provided.

According to other exemplary, a control method of a server includes: storing analysis result information about at least one image corresponding to an analysis type of at least one image analysis model with respect to the at least one image; receiving an inquiry about an image from an external apparatus; identifying an analysis type of an image analysis model corresponding to the inquiry about the image; based on the stored analysis result information about the at least one image, identifying or generating a search result corresponding to the identified analysis type and the inquiry, and transmitting the search result to the external apparatus.

With this, even though the user freely enters the inquiry without limiting to a specific type of information with respect the image, information about the image that meets the user's request may be provided.

The receiving may include receiving inquiries from a plurality of external apparatuses, respectively and the transmitting may include transmitting the generated search result to each of the plurality of external apparatuses.

Accordingly, the various types of image analysis information about the image may be provided to the plurality of images.

According to other exemplary, a control method of a display apparatus includes: receiving an inquiry about an image including a content about an analysis type of an image analysis model; transmitting the inquiry to an external apparatus; receiving, from the external apparatus, a search result identified or generated based on analysis result information about the image and corresponding to the analysis type included in the inquiry; and displaying the received search result.

The method may include transmitting information about the analysis type of the image analysis model corresponding to the inquiry about the image, to the external apparatus.

According to other exemplary, a computer program is provided. The computer program is stored in a medium to execute the above described control method combining with an electronic apparatus.

The computer program may be stored in a medium of a server, and downloaded to the electronic apparatus via a network.

As described above, according to the embodiments, more various types of services may be provided with respect to the image.

DETAILED DESCRIPTION

Figure 1:
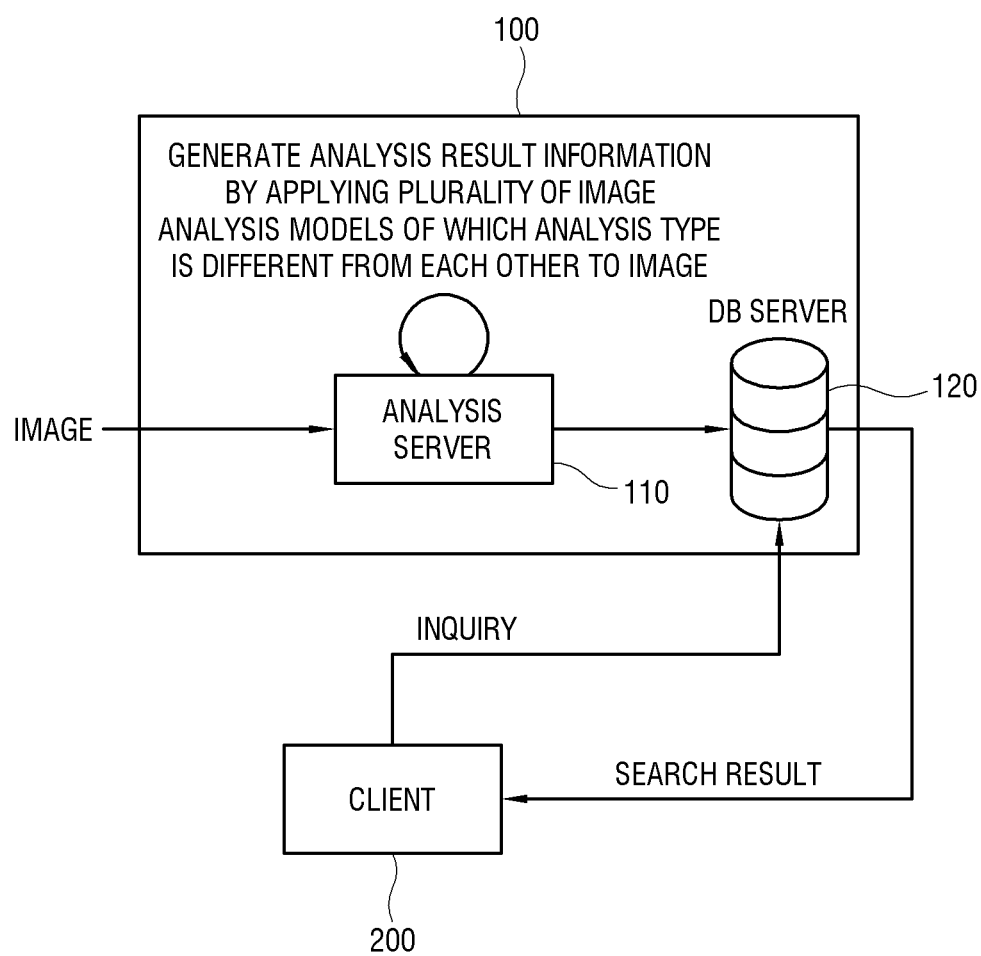
FIG. 1 is a schematic view showing an outline of a system according to an embodiment.

Below, embodiments will be described in detail by reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the present inventive concept and the key configurations and functions. In the following descriptions, details about publicly known functions or features will be omitted if it is identified that they cloud the gist of the present inventive concept.

In the following embodiments, terms 'first', 'second', etc. are only used to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be modularized into at least one processor. Further, in the following embodiments, at least one among a plurality of elements refer to not only all of the plurality of elements but also each element among the plurality of elements excluding the other elements or a combination thereof. Further, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "apparatus configured to" may refer to "capable of" along with other devices or parts in a certain circumstance. For example, the phrase of "the processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

FIG. 1 shows a system including a server 100 and a client 200 according to an embodiment.

The server 100 according to an embodiment may include an analysis server 110 and a database (DB) server 120. However, the present disclosure does not exclude that one server 110 carries out both a function of the analysis server 110 and a function of the DB server 120.

The analysis server 110 is not limited and if any device can process an image regardless of a title or type thereof, it may be applied thereto. The DB server 120 is also not limited and if any device can store result information about the processed image and provide search results in response to an inquiry of the client 200 regardless of t a title or type thereof, it may be applied thereto.

The client 200 according to an embodiment may be actualized by a display apparatus, such as, for example, a television (TV). Further, the client 200 according to another embodiment may, for example, be actualized by a smartphone, a tablet computer, a mobile phone, a smartwatch, a head-mounted display or the like wearable device, a computer, a multimedia player, an electronic frame, a digital billboard, a large format display (LFD), a digital signage, a set-top box, a refrigerator, etc. However, the client 200 according to an embodiment is not limited thereto, and if any device can transmit the inquiry to the server 100 and receive and process search results from the server 100, it may be applied thereto.

Moreover, the present disclosure may be actualized in a form that one device carries out both the function of the analysis server 110 and the function of the DB server 120 without dividing the server 100 and the client 200. However, for the convenience of explanations, a construction divided into the server 100 and the client 200, will be explained.

To sum up operations of the server 100 and the client 200 according an exemplary with reference to FIG. 1, the analysis server 110 receives an image, and applies a plurality of image analysis models of which an analysis type is different from each other to the received image to generate analysis result information. The DB server 120 stores the analysis result information generated in the analysis server 110, receives an inquiry from the client 200 and transmits a search result corresponding thereto to the client 200. The client 200 transmits the inquiry to the DB server 120, and receives the search result from the DB server 120 to carry out a processing based thereon. Details about respective operations thereof will be described later.

Figure 2:
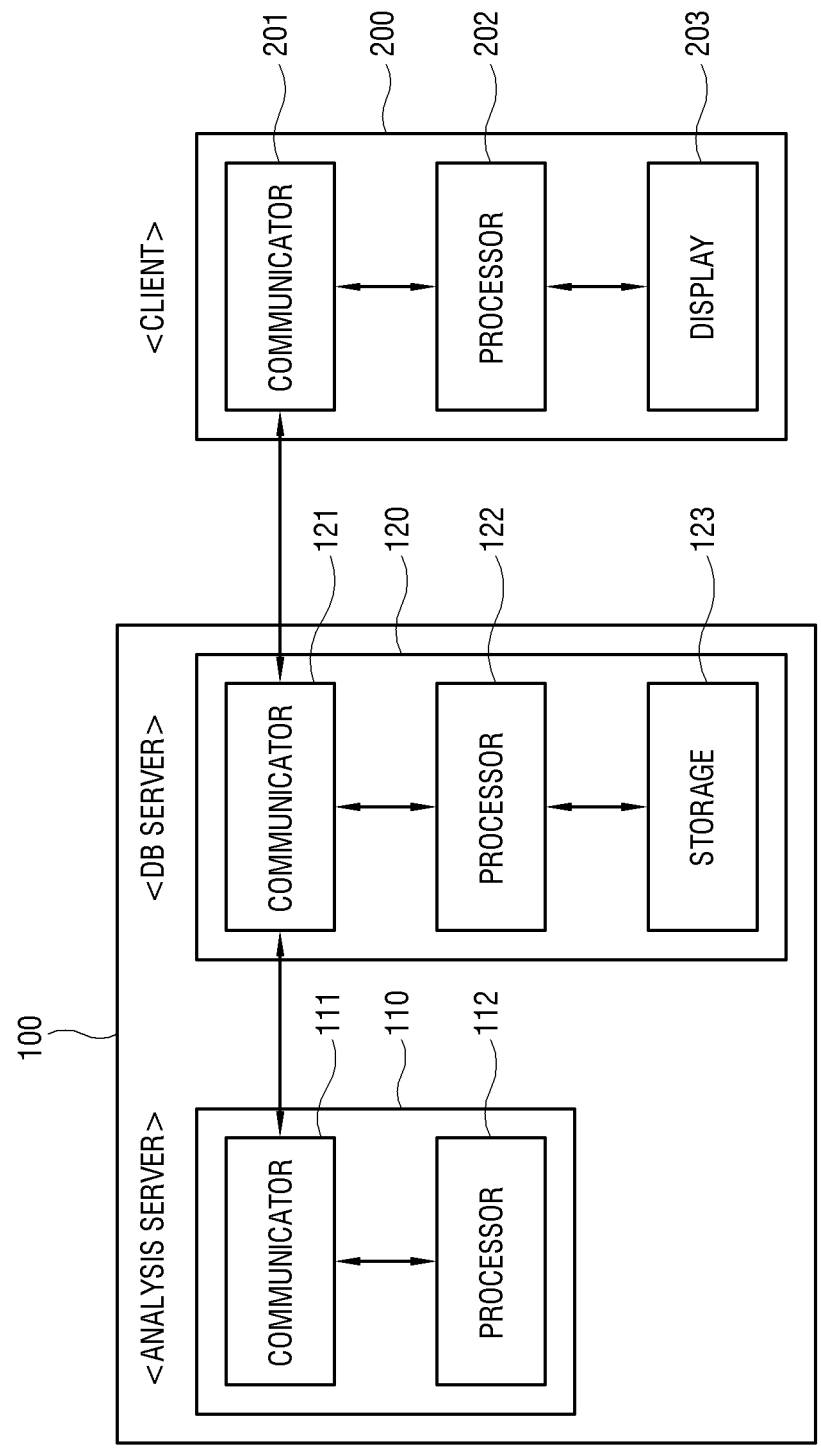
FIG. 2 is a block diagram showing a construction of the system according to an embodiment.

FIG. 2 shows a construction of the system including the server 100 and the client 200 according to an embodiment.

The analysis server 110 according to an embodiment includes a communicator 111 and a processor 112. The DB server 120 includes a communicator 121, a processor 122, and a storage 123. The client 200 includes a communicator 201, a processor 202, and a display 203. However, the constructions of the server 100 and the client 200 shown in FIG. 2 are only an example, and the server 100 and the client 200 according to an embodiment may be actualized in other constructions. In other words, the server 100 and the client 200 according to an embodiment may be actualized, so that other elements are included in addition to the configurations shown in FIG. 2 or some elements are excluded from the configurations shown in FIG. 2.

The communicator 111 of the analysis server 110 may communicate with an external apparatus, for example, the DB server 120 or the client 200, and receive an image from the external apparatus. The communicator 111 may communicate by wired or wireless. Accordingly, the communicator may be actualized in many different communication ways besides a connection part including a connector or terminal for wired connection. For example, the communicator may be configured to perform one or more communications among Wi-Fi, Bluetooth, Zigbee, IR communication, radio control, ultra-wide band (UWB), wireless USB, and near field communication (NFC). The communicator 111 may include a communication module, such as Bluetooth low energy (BLE), serial port profile (SPP), WiFi direct, IR communication, Zigbee, near field communication (NFC), etc. The communicator 111 may be actualized in the form of a device, a software (S/W) module, a circuit, a chip, etc.

The processor 112 of the analysis server 110 may process an image signal received by the communicator 111. For example, the processor 112 may carry out a signal processing corresponding to a specification of the received image signal to extract data of a broadcast content.

There are no limits to the kinds of image processing processes performed by the processor 112. For example, the image processing performed by the processor 112 may include demultiplexing for dividing an input stream into sub streams of video, audio and appended data; decoding corresponding to an image format of an image stream; deinterlacing for converting an interlaced type of the image stream into a progressive type; scaling for adjusting the image stream to have a preset resolution; noise reduction for improving image quality; detail enhancement; frame refresh rate conversion; etc.

The processor 112 may perform control for operating general elements of the analysis server 110. The processor 112 may include a control program (or instruction which carries out the control, a nonvolatile memory in which the control program is installed, a volatile memory in which at least a part of the installed control program is loaded, and at least one processor or central processing unit (CPU) by which the loaded control program is executed. Also, the control program may be stored in an electronic apparatus other than the analysis server 110.

The control program may include a program(s) achieved in the form of at least one of a basic input/output system (BIOS), a device driver, an operating system, a firmware, a platform, and an application program. According to an embodiment, the application program may be previously installed or stored in the analysis server 110 when the analysis server 110 is manufactured, or may be installed in the analysis server 110 on the basis of application program data received from the outside when used in the future. The data of the application program may be, for example, downloaded from an application market and the like external server to the analysis server 110, but is not limited thereto. Meanwhile, the processor 112 may be actualized in the form of a device, an S/W module, a circuit, a chip, or combination thereof.

The processor 112 control the communicator 111 to receive, for example, the image. Also, the processor 112 controls the communicator 111 to transmit the result of the image processing performed with respect to the image signal to the external apparatus. Although the analysis server 110 shown in FIG. 2 is illustrated as being actualized in the configuration in which one processor 112 performs both the image processing and the control, this is only an example. The analysis server 110 according to another embodiment may be actualized in a configuration in which a separate controller is provided in addition to the processor.

The DB server 120 according to an embodiment includes the communicator 121, the processor 122, and the storage 123.

Since the explanations about the communicator 111 of the analysis server 110 can be equally applied to the communicator 121 of the DB server 120, detailed explanations about the communicator 121 will be omitted.

The processor 122 of the DB server 120 is different from the processor 112 of the analysis server 110 in that it receives and processes the inquiry from the client 200. However, since other than that, the explanations about the processor 112 of the analysis server 110 can be equally applied to the processor 122 of the DB server 120, detailed explanations thereabout will be omitted.

The storage 123 of the DB server 120 may store analysis result information generated as the analysis result of the analysis server 110. The storage 123 may store various data according processing and control of the processor 122. The storage 123 may be accessed by the processor 122, which performs reading, writing, editing, deleting, updating, etc. with regard to the data therein. The storage 123 may include a nonvolatile memory, such as a flash-memory, a hard-disc drive, a solid-state drive (SSD) and the like, which can retain data regardless of whether a system power of the DB server 120 is provided or not. Also, the storage 123 may include a volatile memory, such as a buffer, a random access memory (RAM) and the like, in which the data to be processed by the processor 122 is temporarily loaded.

The client 200 according to an embodiment includes the communicator 201, the processor 202, and the display 203.

Since the explanations about the communicator 111 of the analysis server 110 can be entirely applied to the communicator 201 of the client 200, detailed explanations about the communicator 201 will be omitted.

Although the processor 202 of the client 200 is different from the processor 112 of the analysis server 110 in that it receives and processes the search result with respect to the inquiry from the DB server 120, the explanations about the processor 112 of the analysis server 110 except for that can be entirely applied thereto. Accordingly, detailed explanations about the processor 202 of the client 200 will be omitted.

The display 203 may display the search result received from the DB server 120. Implementation type of the display 203 is not limited and the display 14 may be implemented in various display forms, such as liquid crystal display (LCD), plasma display panel (PDP), light emitting diodes (LED), organic light emitting diodes (OLED), surface-conduction electron-emitter, carbon nano-tube, nano-crystal, etc. If using the liquid crystal, the display 203 includes a LCD panel, a backlight unit for supplying light to the LCD panel, a panel driver for driving the LCD panel, etc. Alternatively, the display 203 may be actualized by an OLED panel that can emit light in itself without the backlight unit.

Figure 3:
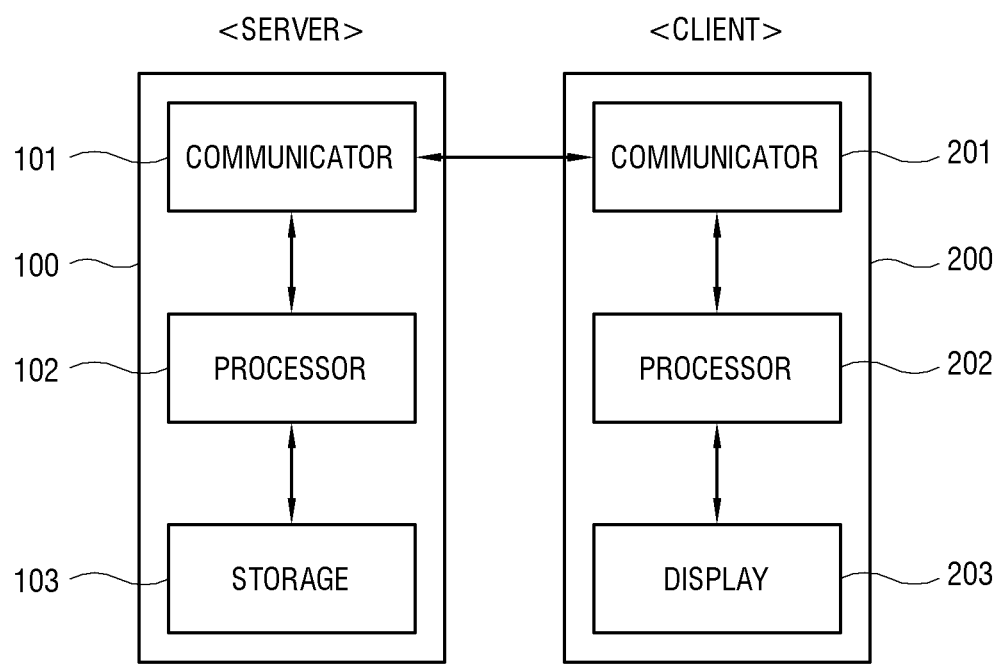
FIG. 3 is a block diagram showing a construction of a system according to another embodiment.

FIG. 3 shows a construction of the system including the server 100 and the client 200 according to another embodiment. The server 100 according to another embodiment may include all of a communicator 101, a processor 102 and a storage 103, so that one server 100 can perform all functions of the analysis server 110 and the DB server 120 shown in FIG. 2. In particular, the processor 102 may perform both the function of the processor 112 of the analysis server 110 and the function of the processor 122 of the DB server 120. However, for the sake of convenience, the following explanations are based on the assumption of including the analysis server 110 and the DB server 120, as shown in FIG. 2.

Figure 4:
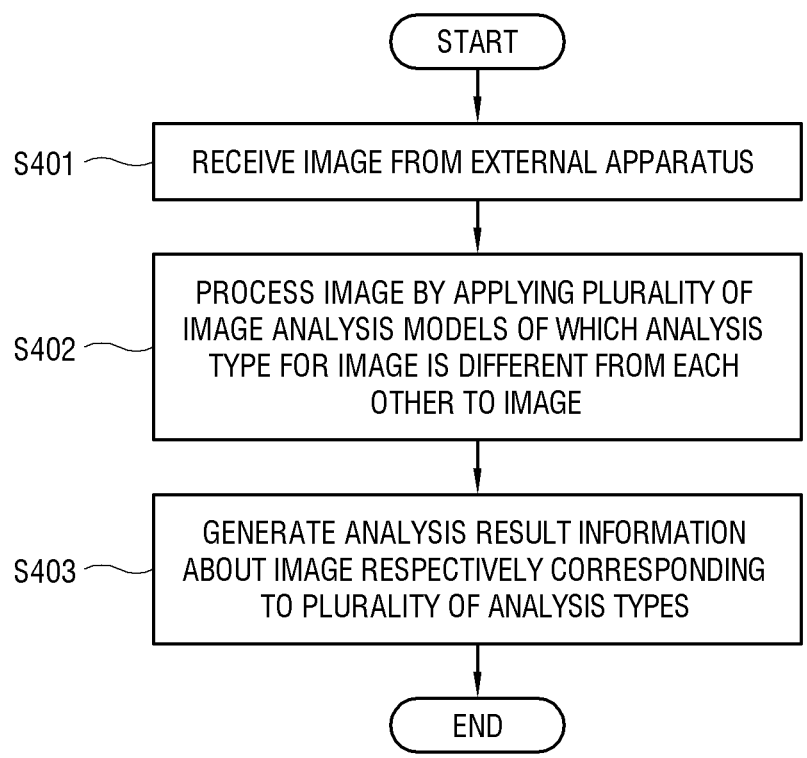
FIG. 4 is a flowchart showing a control method of an analysis sever according to an embodiment.

FIG. 4 shows a control method of the analysis sever 110 according to an embodiment.

The processor 112 of the analysis sever 110 receives an image from an external apparatus via the communicator 111 (S401), and processes the received image by applying a plurality of image analysis models of which an analysis type for image is different from each other to the received image (S402).

Here, the image analysis models commonly refer to processing methods used in the image analysis, and if there is any processing method able to perform the image analysis, it may be included in the image analysis models. Processing targets for the image analysis models are not limited to analyses about image itself, and may also include processing methods for analyzing voice or sound reproduced together with the image.

Also, what the analysis types for image are different between the image analysis models means that at least one of an analysis purpose, an analysis target, an analysis method, an analysis frame, an applied technology, or a basic structure is different between the image analysis models.

If classifying the image analysis models on the basis of the analysis purpose, the analysis target or the like, they may include an object recognition model, an object tracking model, a text recognition model, a scene dividing model, a scene recognition model, an image description text generating model, a video description text or summary generating model, an image enhancement model, an image generating model (for example, a generative adversarial network (GAN), a style transfer, etc.), a voice recognition model, etc. Also, if classifying the image analysis models on the basis of the analysis method, the applied technology or the like, they may include a machine learning model, a neural network model, a deep learning model, an area based classification model, a pixel based classification model, etc. However, the image analysis models are not limited thereto.

After that, the processor 112 generates analysis result information about the image corresponding to each of the plurality of analysis types (S403). Since the processor 112 applies the plurality of image analysis models of which the analysis type for image is different from each other to one image, image analysis information corresponding to each of the analysis types according to analysis types is generated.

According to this, by applying the plurality of image analysis models of which the analysis type for image is different from each other to the one image, various types of image analysis information may be provided with respect to the one image.

Figure 5:
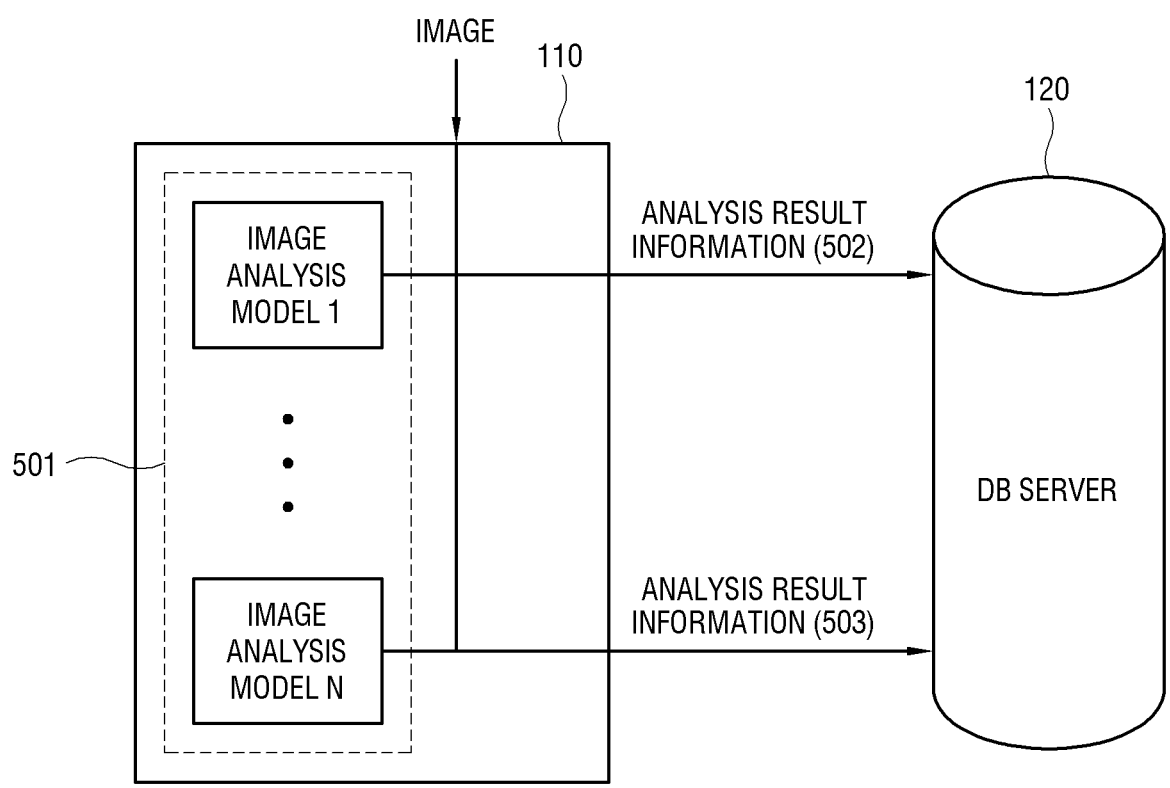
FIG. 5 is a view showing an operation of the analysis sever according to an embodiment.

FIG. 5 shows an operation of the analysis sever 110 according to an embodiment. As shown in FIG. 5, the processor 112 of the analysis sever 110 processes an received image by applying a plurality of image analysis models 501 from an image analysis model 1 to an image analysis model N to the received image. As the processed results, the image analysis models generates analysis result information 502 and 503 corresponding to the analysis types thereof, respectively. The generated analysis result information may include, for example, object information, text information, and/or scene information, which are included in the image, image or video description text analysis information, summary analysis information, voice recognition information, etc. In other words, since the plurality of image analysis models of which the analysis type for image is different from each other is applied with respect to one image, analysis result information generated as the processed results thereof may also become information corresponding to various analysis types. The processor 112 may transmit the analysis result information 502 and 503 generated through the process as described above to the DB server 120 to store therein.

Figure 6:
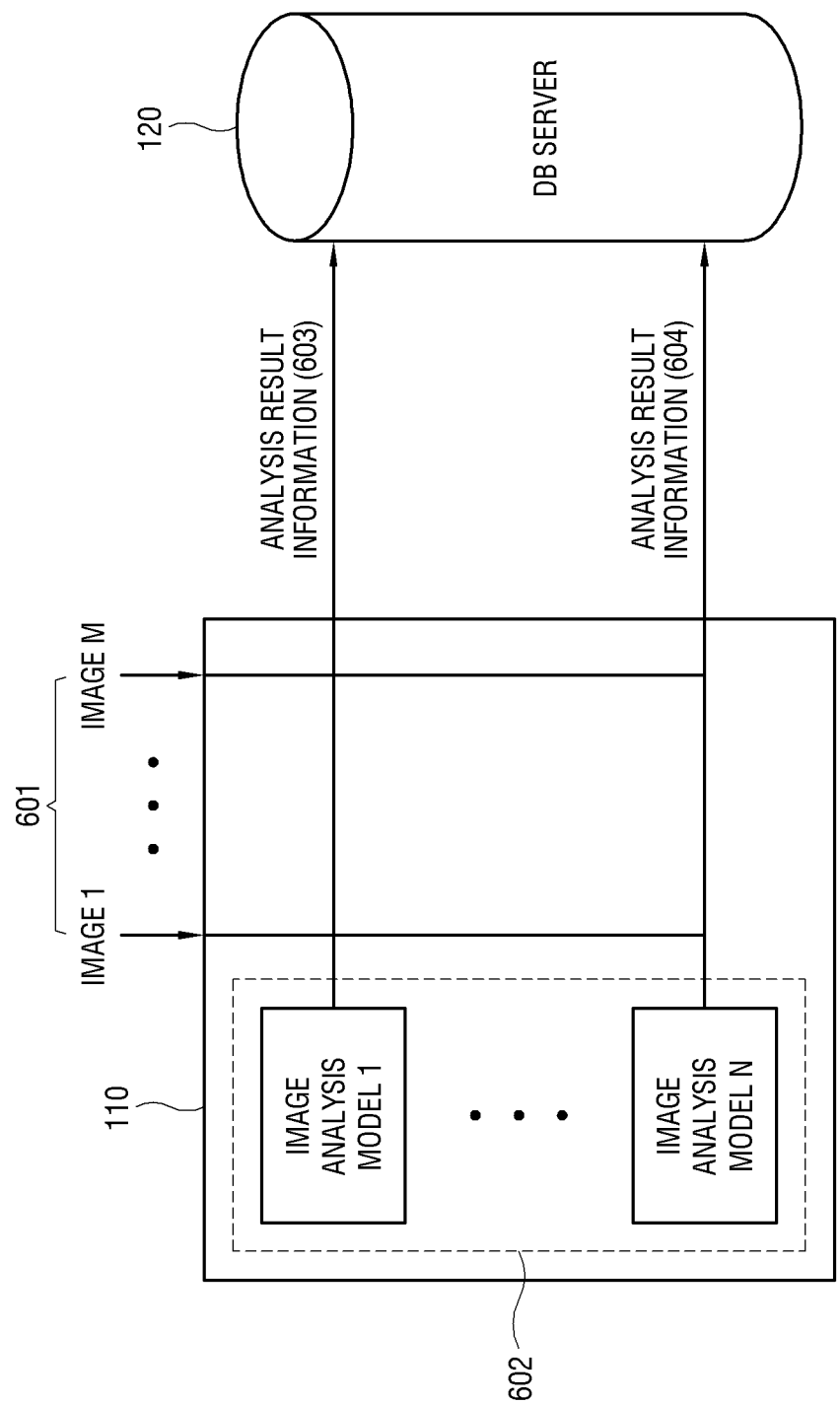
FIG. 6 is a view showing an operation of the analysis sever according to another embodiment.

FIG. 6 shows an operation of the analysis sever 110 according to another embodiment. In the embodiment described above, the processor 112 of the analysis sever 110 was illustrated and explained as receiving one image and applying the plurality of image analysis models thereto. However, the member of the image received by the processor 112 is not limited. The analysis sever 110 according to another embodiment may include a plurality of image receivers, each of which receives an image, and receive a plurality of images therethrough and process the plurality of received images by applying a plurality of image analysis models of which an analysis type for image is different from each other to each of the plurality of received images.

Referring to FIG. 6, the processor 112 of the analysis sever 110 according to another embodiment may receive a plurality of images 601 and process the plurality of received images 601 by applying a plurality of image analysis models 602 to each of the plurality of received images 601. The processor 112 may receive the plurality of images 601 at times different from each other or at the same time.

As the processed result, the image analysis models generate analysis result information 603 and 604 corresponding to the analysis types thereof with respect to each of the plurality of images. In comparison with FIG. 5 as described above, the image analysis models of FIG. 5 generate the analysis result information only with respect to one image, but the image analysis models of FIG. 6 generate the analysis result information with respect to the plurality of images. The processor 112 may transmit the analysis result information 603 and 604 generated through the process as described above to the DB server 120 to store therein.

According to this, various types of image analysis information may be provided even with respect to the plurality of images.

Figure 7:
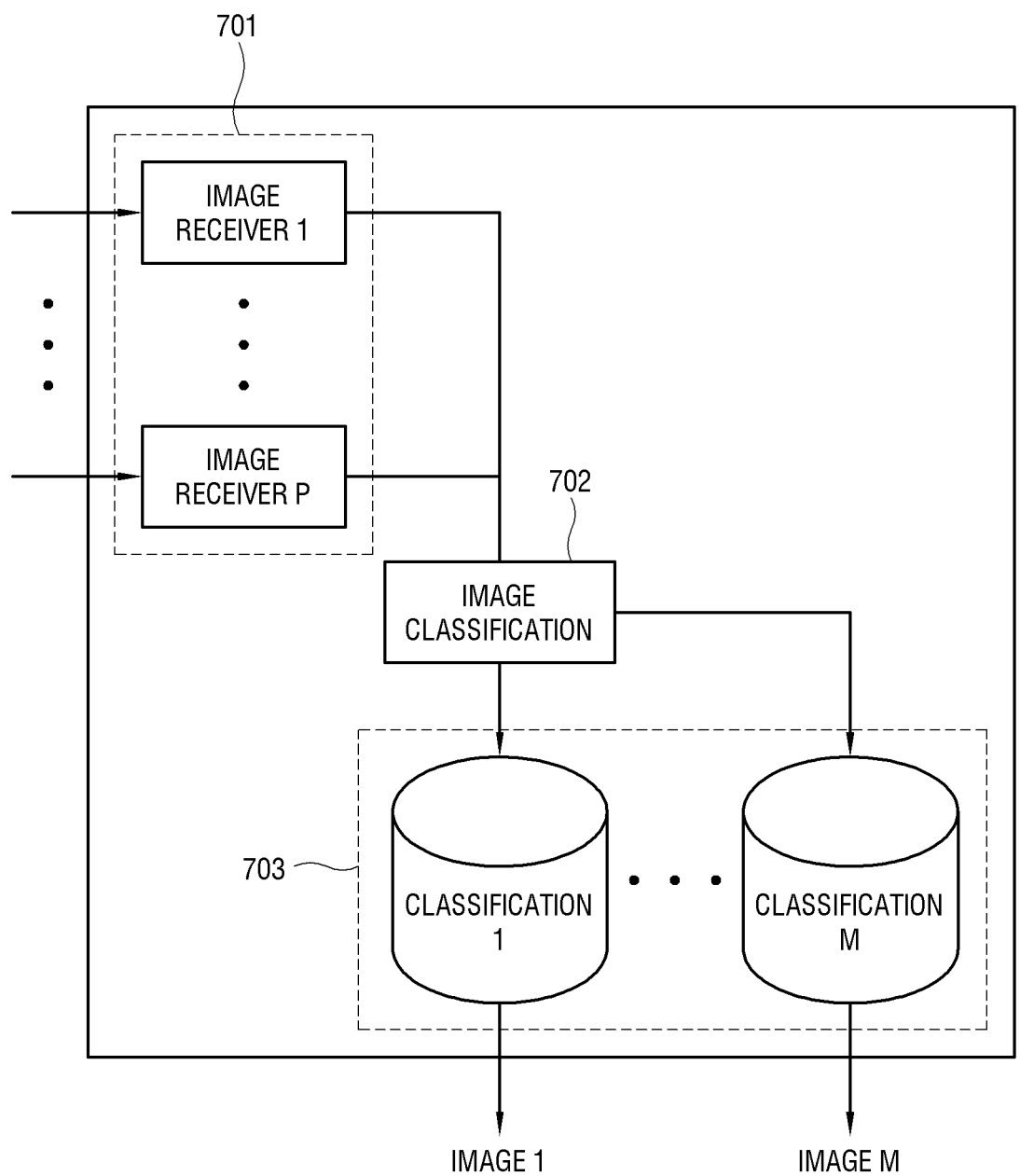
FIG. 7 is a view showing an operation of the analysis sever according to further another embodiment.

FIG. 7 shows an operation of the analysis sever 110 according to further another embodiment. The processor 112 of the analysis sever 110 according to further another embodiment may classify images received via the communicator 111 or image receivers 701 according to kinds (702), and process the classified images by applying the plurality of image analysis models of which the analysis type is different from each other to each of the images classified according to kinds (703).

As an example, the processor 112 of the analysis sever 110 according to further another embodiment may classify the received images according to kinds of image supplying sources. The image supplying sources from which the analysis sever 110 receives the image are not specifically limited. For example, the analysis sever 110 may receive the images from many different image supplying sources, such as a terrestrial television (TV) broadcasting, a cable TV broadcasting, a satellite TV broadcasting, an internet protocol (IP) TV broadcasting, a video on demand (VOD) image, a streaming image, etc. In this case, the processor 112 may classify the received images according to image supplying sources, and process the classified images by applying the plurality of image analysis models of which the analysis type is different from each other to each of the classified images. As another example, the processor 112 may classify the images according to genres or contents thereof. For example, the processor 112 may classify the images according to contents of the images, such as drama, sports, music broadcasting, entertainment, etc. and then process the classified images by applying the plurality of image analysis models of which the analysis type is different from each other to each of the classified images. The processor 112 may classify the images using information about image, such as tag, metadata or the like, transmitted together the images, or directly analyzing the images.

After classifying the received images according to kinds as described above, the processor 112 may optimizes the image analysis models to be suited to the classified images and apply the optimized image analysis models thereto according to classifications.

With this, a reliability in the various types of image analysis information provided with respect to the images may be increased.

Figure 8:
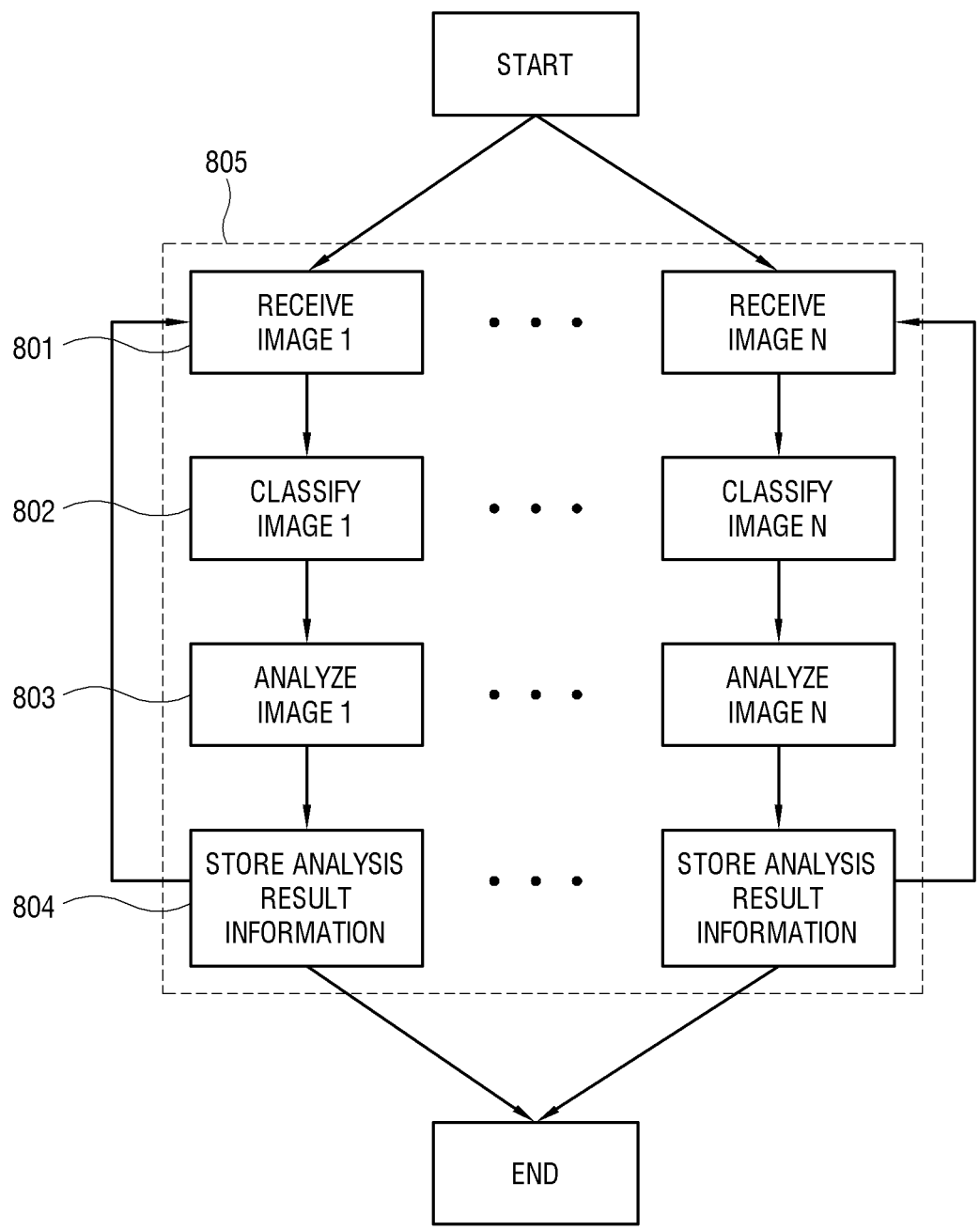
FIG. 8 is a view showing an operation of the analysis sever according to other embodiment.

FIG. 8 shows an operation of the analysis sever 110 according to other embodiment. The analysis sever 110 according to other embodiment includes a plurality of image receivers, and simultaneously processes a plurality of image (805) by proceeding a series of processes, which receives a plurality of images at the same time via the plurality of image receivers (801), classifies the received images (802), applies image analysis models of which an analysis type is different from each other to the classified images (803), and stores analysis result information generated as the applied result (804), in parallel with respect to the plurality of image.

According to this, various types of image analysis information with respect to the images may be more effectively provided.

Figure 9:
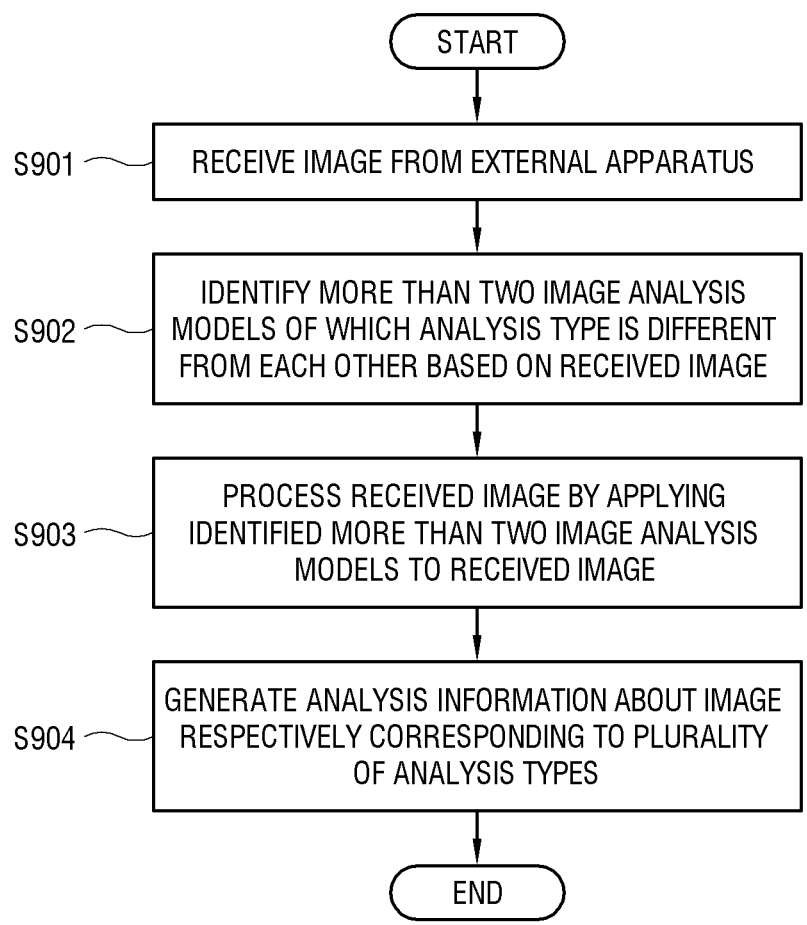
FIG. 9 is a flowchart showing a control method of the analysis sever according to another embodiment.

FIG. 9 shows a control method of the analysis sever 110 according to another embodiment. The processor 112 of the analysis sever 110 according to another embodiment may identify more than two image analysis models to be applied to a received image based on the received image.

Referring to FIG. 9, the processor 112 of the analysis sever 110 according to another embodiment receives an image from an external apparatus (S901). And then, the processor 112 identifies more than two image analysis models to be applied to the received image from among a plurality of image analysis models of which an analysis type is different from each other, based on the received image (S902), and processes the received image applying the identified more than two image analysis models to the received image (S903), and generates analysis result information corresponding to the analysis types of the plurality of image analysis models, respectively, according to the processed result (S904).

As an example, the processor 112 may identify the more than two image analysis models to be applied to the received image according to kinds or genres of the received image. For example, if an image about drama or movie is received, the processor 112 may identify to apply a scene recognition model and a video summary generating model to the image. To the contrary, if an image about advertisement is received, the processor 112 may identify to apply an object recognition model or a text recognition model rather than the scene recognition model or the video summary generating model to the image.

According to this, when providing various types of image analysis information with respect to the image, image analysis information useful as well as appropriate for the image may be effectively provided.

Hereinafter, an interaction between the server 100, which stores the analysis result information about image generated through the process as described above, and the client 200, which receives the inquiry of the user about the image, will be described.

Figure 10:
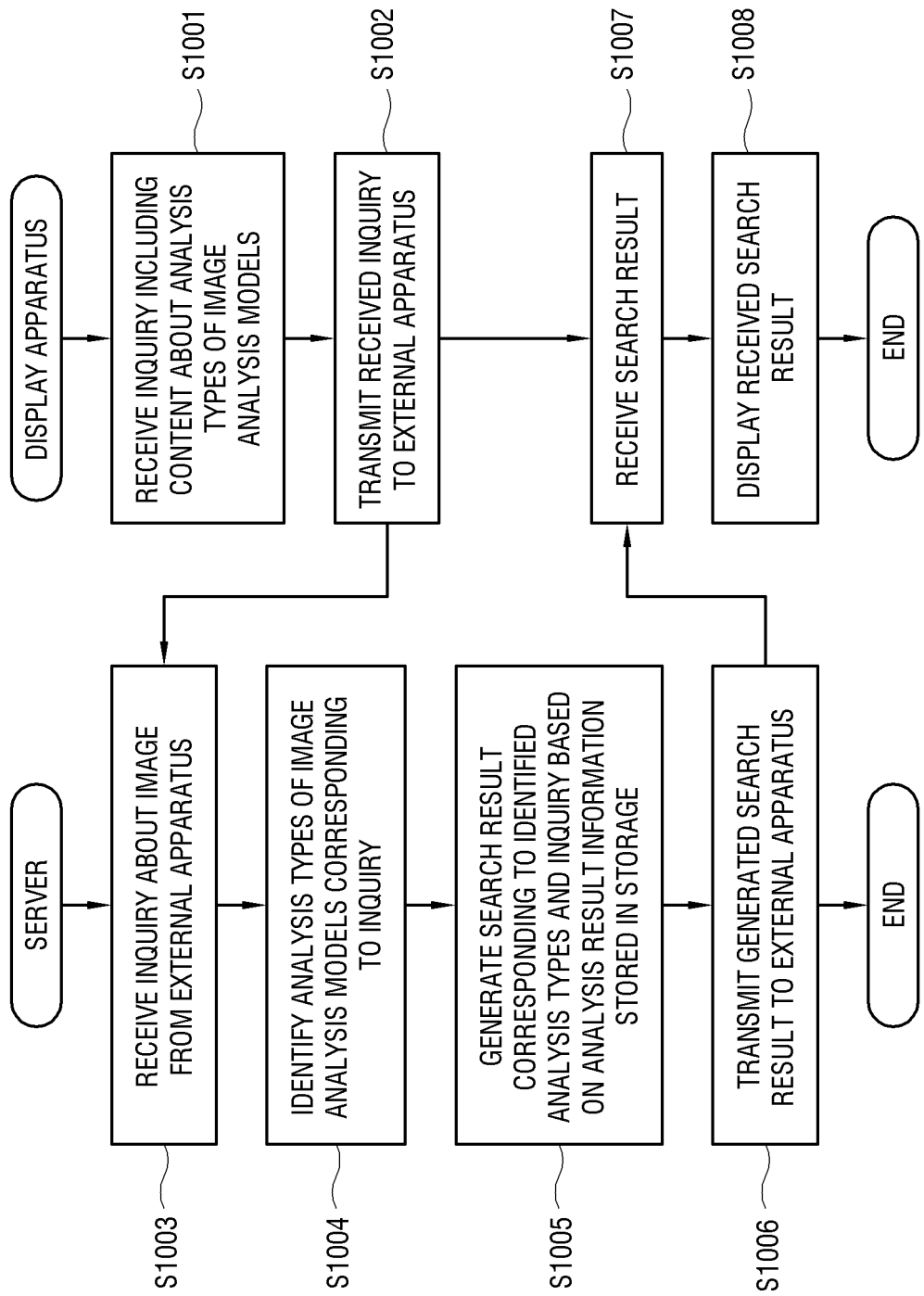
FIG. 10 is a flowchart showing a control method of a database (DB) server and a client according to an embodiment.

FIG. 10 shows a control method of the server 100 and the client 200 according to an embodiment. Hereinafter, for the sake of convenience, an example of which the server 100 is a DB server 120 and the client 200 is a display apparatus will be described.

The processor 202 of the display apparatus receives an inquiry including a content about analysis types of image analysis models. Targets or objects from which the processor 202 receives the inquiry are not specifically limited. For example, the processor 202 may receive the inquiry from a user or an external apparatus. If the inquiry is received from the user, ways by which the user inputs the inquiry are not specifically limited. For example, the user may input the inquiry in many different ways, such as a voice input, a remote control, a touch input, a gesture input, etc. Hereinafter, for the sake of convenience, an example of which the user inputs the inquiry via the voice input will be described.

Even though the user does not recognize that the content about analysis types of the image analysis models is included in the inquiry uttered by her or him, it may be included in the inquiry inputted as the voice by her or him. For example, if the user utters an inquiry "Tell me a channel that broadcasts about travel now", a content about analysis types of the image analysis models, such as an object, a text, an image description text or the like, which are related to the travel, is included in the inquiry. For another example, if the user utters an inquiry "Tell me what was aired in the BBS drama yesterday", a content about analysis types of the image analysis models, such as a video description text generating model, a video summary generating model, or the like, is included in the inquiry.

The processor 202, which has received the inquiry from the user, transmits the inquiry to an external apparatus, for example, the DB server 120 (S1002).

The processor 122 of the DB server 120 receives the inquiry transmitted by the display apparatus (S1003), and then identifies analysis types of the image analysis models corresponding to the inquiry (S1004). As described above, since the content about analysis types of the image analysis models is included in the inquiry of the user, the processor 122 may identify analysis types of the image analysis models corresponding to the inquiry of the user therefrom. For example, if the inquiry of the user is in the form of a voice signal, the processor 122 may identify analysis types of the image analysis models based on a result of voice recognition processed with respect to the voice signal. The processor 122 may directly perform the voice recognition processing with respect to the voice signal or receive a result of voice recognition processed in the processor 202 of the display apparatus therefrom to use it. Also, the processor 122 may perform the voice recognition processing using a separate speech-to-text (STT) server different from the DB server 120 or the display apparatus.

As an example, the processor 122 may identify analysis types of image analysis models based on the voice recognition-processed result by establishing keywords corresponding to the analysis types of the image analysis models according to analysis types thereof as a database (DB) and then identifying whether the voice recognition result is matched with the DB. As another example, the processor 122 may learn a large amount of data about the voice recognition-processed result and the analysis types of the image analysis models corresponding thereto, and then identify analysis types of image analysis models corresponding to an input voice of the user using the learned models. However, ways of identifying the analysis types of image analysis models based on the result of processed voice recognition are not limited thereto.

If the analysis types of the image analysis models corresponding to the inquiry are identified, the processor 122 identifies or generates a search result corresponding to the identified analysis types and the inquiry based on the analysis result information about image stored in the storage 123 (S1005). The search result may be analysis result information itself corresponding to the identified analysis types and the inquiry including them, and may be an image corresponding to the analysis result information or information related thereto. For example, since if a voice command "Tell me what was aired in the BBS drama yesterday" is input as an inquiry, a content aired in the BBS drama yesterday is stored as a summary in the form of analysis result information in the storage 123, the processor 122 identifies the analysis result information as a search result. As another example, if a voice command "Tell me a channel that broadcasts about travel now" input as an inquiry, the processor 122 identifies analysis result information corresponding to the travel, and then does not identifies the analysis result information as a search result right away, but figure out an image corresponding to the analysis result information and furthermore figure out a broadcasting channel of broadcasting the image to generate them as the search result. After that, the processor 122 of the DB server 120 transmits the search result identified or generated as described above to the display apparatus, which is an external apparatus (S1006).

The processor 202 of the display apparatus receives the search result transmitted from the DB server 120 (S1007), and displays the received search result (S1008).

According to this, even though the user freely enters the inquiry without limiting to specific types of information with respect the image, the information about the image that meets the user's request may be provided.

Figure 11:
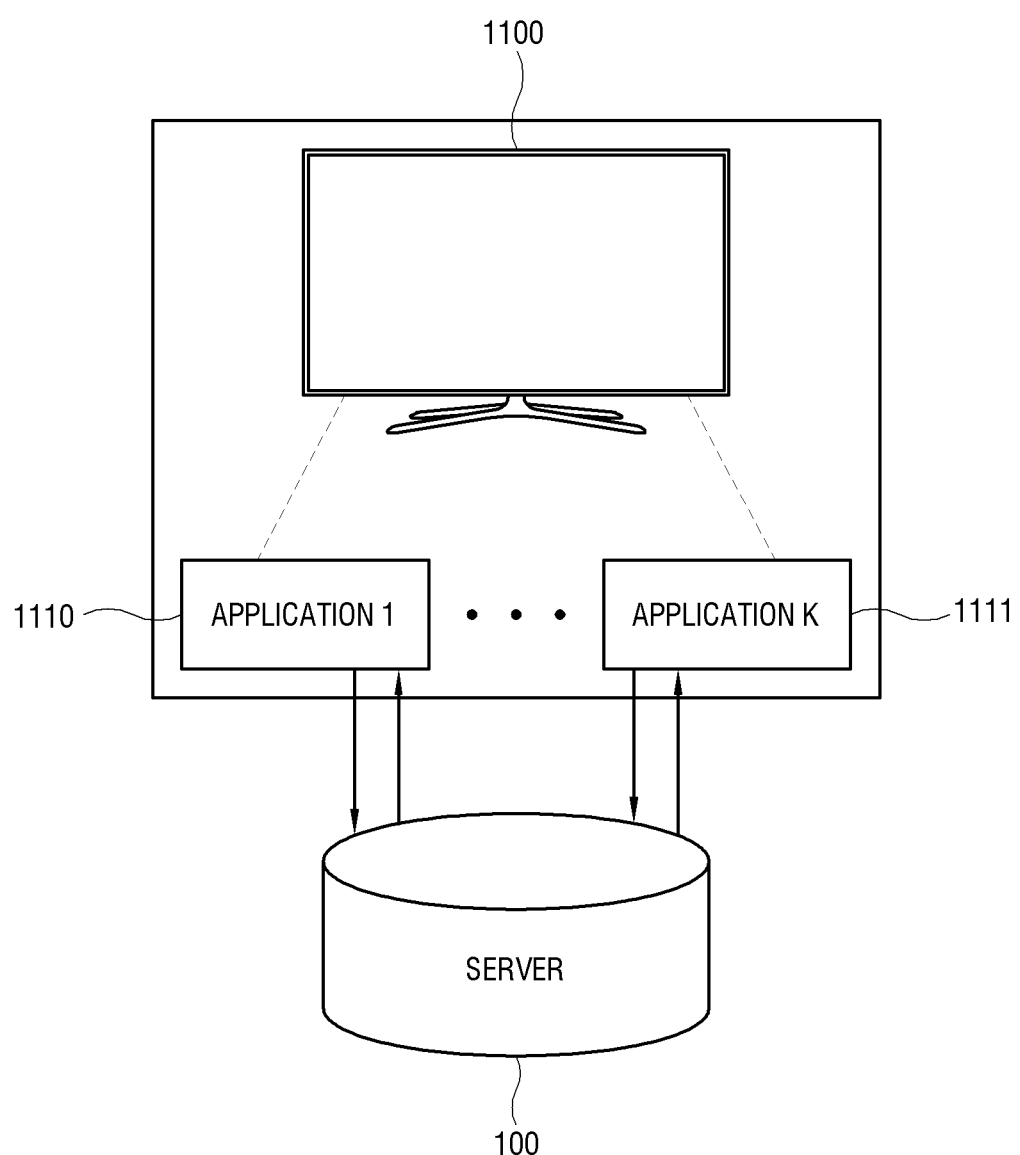
FIG. 11 is a view showing an operation of the client according to another embodiment.

FIG. 11 shows an operation of the server 100 and the client 200 according to another embodiment. The server 100 according to another embodiment may receive inquiries from a plurality of external apparatus, for example, a plurality of clients 200 via the communicator at the same time or different times, and transmit search results identified or generated in the server 100 to the plurality of clients 200, respectively. Here, the clients 200 may mean the display apparatuses 1100 itself, or individual applications 1110 and 1111, which are operating in the display apparatus 1100, as shown in FIG. 11. Accordingly, the server according to an embodiment may receive inquiries from a plurality of applications 1110 and 1111 and transmit search results identified or generated in the server 100 to the plurality of applications 1110 and 1111, respectively, and the respective applications 1110 and 1111 may display information about image based on the received search results. Also, the clients 200 are not limited as the display apparatuses 100 or the applications, and if any things can transmit the inquiries to the server 100 and receive the search results from the server 100, they may be applied thereto.

According to this, the various types of image analysis information may be provided with respect to the plurality of clients.

Figure 12:
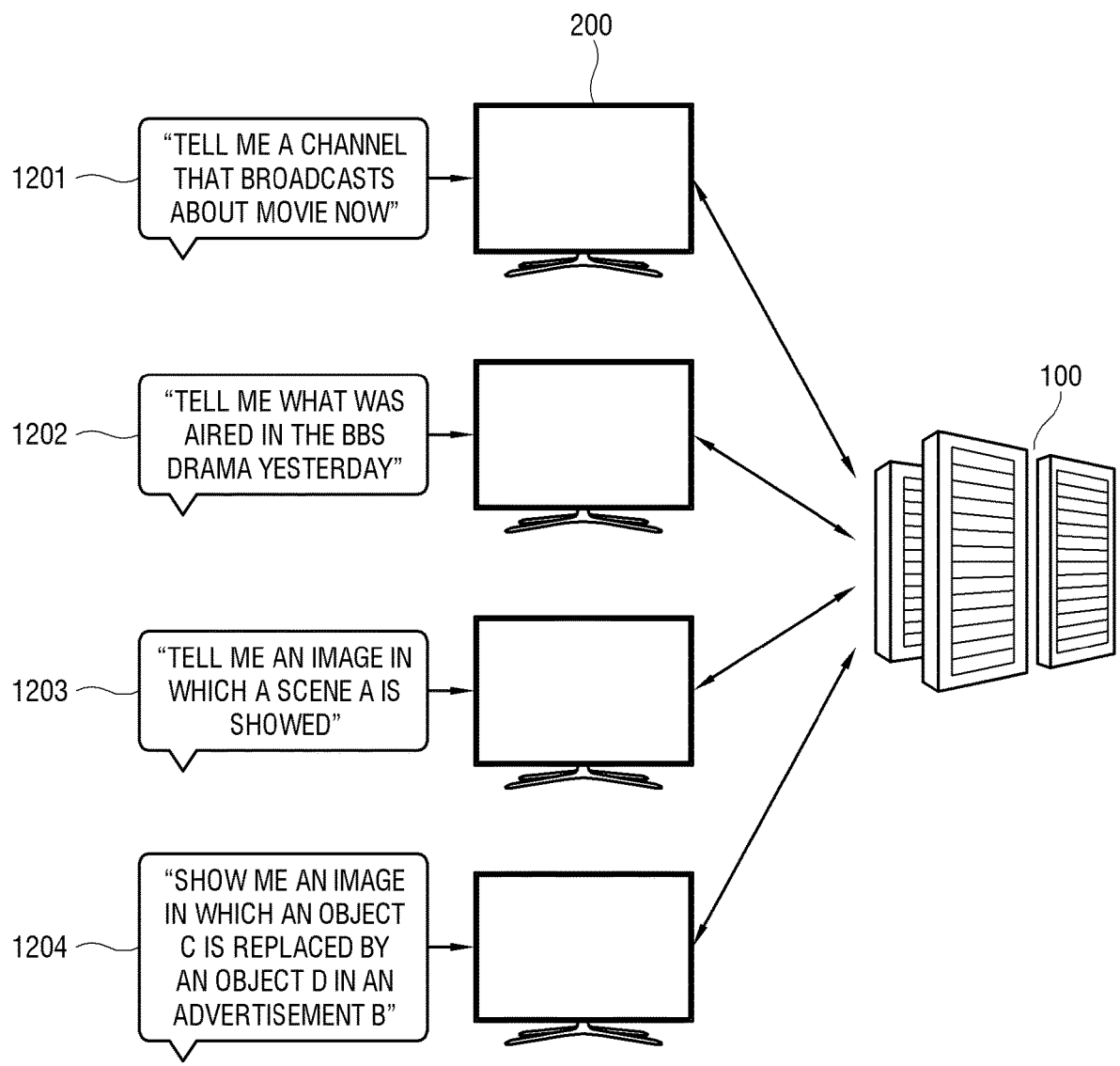
FIG. 12 is a view showing an operation example of the system according to an embodiment.

FIG. 12 shows an operation example of the system including the server 100 and the client 200 according to an embodiment.

As an example, if the user inputs an inquiry "Tell me a channel that broadcasts about movie now" (1201) to the client 200 by voice, the processor 202 of the client 200 transmits the received inquiry to the server 100. The processor 102 of the server 100, which receives the transmitted inquiry, recognizes the received inquiry and identifies analysis types of image analysis models corresponding to the identified inquiry. The analysis types of image analysis models corresponding to the identified inquiry "Tell me the channel that broadcasts about movie now" may be an object, such as a movie poster or the like, may be a text "movie", and may be summary information about the movie itself, a video description text about film introduction program, etc. The processor 102 may identify object information of the movie poster or the like, text information of the "movie", summary information about the movie, video description text information about the film introduction program, etc. from among the analysis result information about image stored in the storage 103 based on the identified analysis types of image analysis models and the identified inquiry. After that, the processor 102 may figure out an image corresponding to the respective identified information, generate information about a channel of broadcasting the image as a search result and transmit the generated information to the client 200, and the processor 202 of the client 200 may display the received information on the display 203. Accordingly, the user may be provided with the information about the channel broadcasting the movie or the film introduction program, the image including the movie poster or the like therein or the image including the text "movie" therein, etc. via the client 200.

As another example, if the user inputs an inquiry "Tell me what was aired in the BBS drama yesterday" (1202) to the client 200 by voice, the processor 122 of the server 100, which receives the inquiry, identifies that video description text or summary information for the BBS drama aired yesterday is analysis result information of analysis types corresponding thereto and provides the analysis result information as a search result. Accordingly, the client 200, which has received the search result, may display the video description text or summary information for the BBS drama aired yesterday to the user.

As further another example, if the user inputs an inquiry "Tell me an image in which a scene A is showed" (1203) to the client 200 by voice, the processor 122 of the server 100, which receives the inquiry, may identify a scene dividing model or a scene recognition model as an analysis type corresponding thereto, search analysis result information about dividing information or recognition information for the scene A from the storage 103, and provide information of an image corresponding thereto as a search result. Accordingly, the client 200, which has received the search result, may display the information about the image in which the scene A is showed to the user.

As other example, if the user inputs an inquiry "Show me an image in which an object C is replaced by an object D in an advertisement B" (1204) to the client. 200 by voice, the processor 122 of the server 100, which receives the inquiry, may identify an image generating model, for example, a CAN model as an analysis type corresponding thereto, and apply the GAN model to an image of advertisement B to provide an image in which an object C is replaced by an object D in the image of advertisement B, as a search result. Accordingly, the client 200, which has received the search result, map display the image that meets the user's request, to the user.

Figure 13:
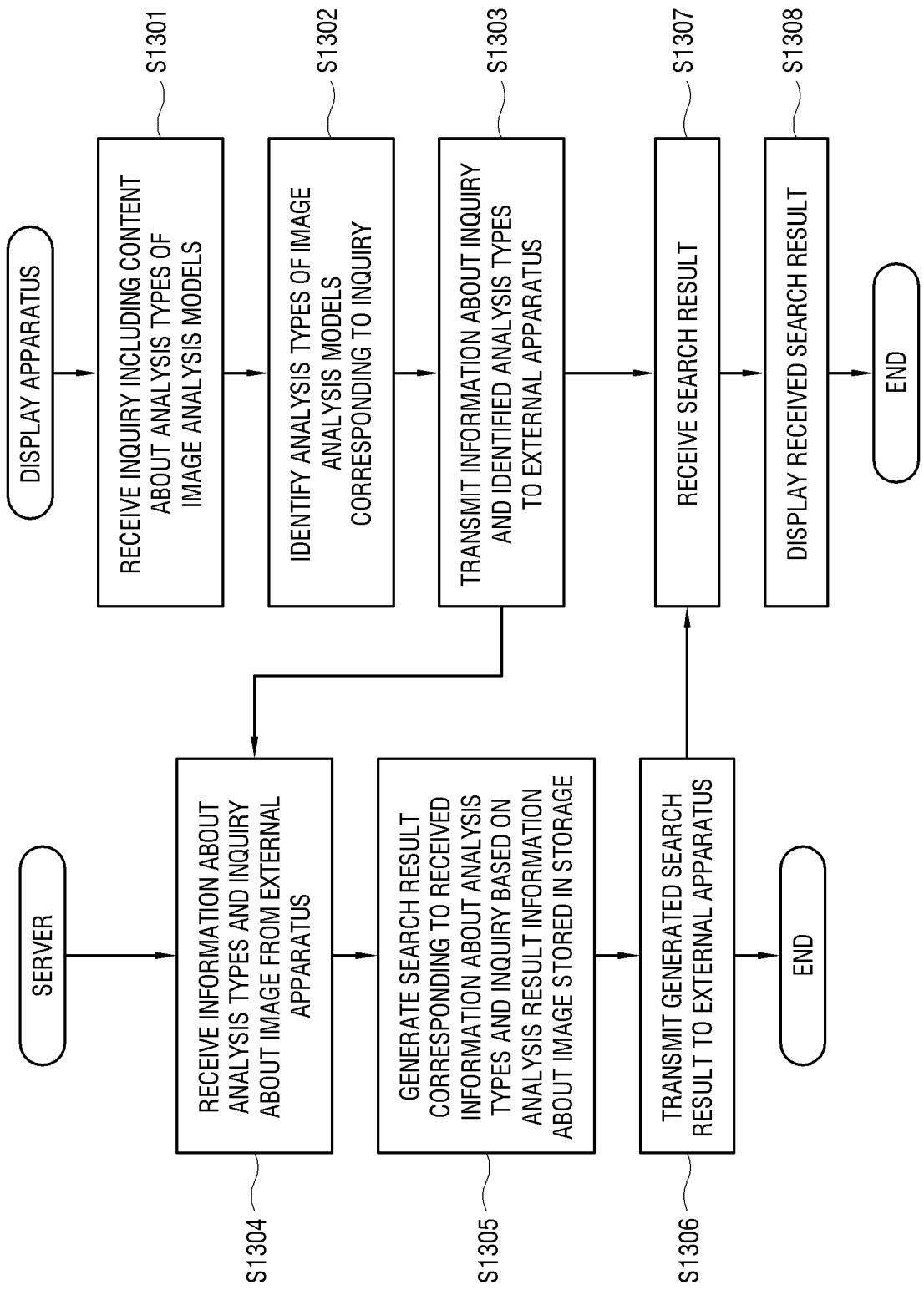
FIG. 13 is a flowchart showing a control method of the DB server and the client according to another embodiment.

FIG. 13 shows a control method of the server 100 and the client 200 according to another embodiment. Although the embodiments as described above are illustrated as identifying the analysis types of image analysis models corresponding to the inquiry of the user about the image by the server 100, the present disclosure is not limited in that the main agent of identifying the analysis types is the server 100. For example, the client 200 may also identify the analysis types of image analysis models corresponding to the inquiry of the user about the image (S1302). In this case, different from the embodiment of FIG. 11 of transmitting only the received inquiry to the server 100, the client 200 may transmits information about the analysis types of image analysis models as described above together with the received inquiry to the server 100 (S1303). The server 100 receives the information and the inquiry (S1304) and identifies or generates the search result based thereon (S1305). If it is sufficient for the server 100 to identify or generate the search result only by the analysis types of image analysis models, the client 200 may transmit only the information about the analysis types of image analysis models and not transmit the received inquiry. Other than that, explanations of FIG. 13 may be applied equal to those disclosed by reference to FIG. 11.

What is claimed is:

1. A server comprising:
a communicator, comprising circuitry, configured to communicate with an external apparatus; and
a processor configured to:
receive at least one first image from the external apparatus via the communicator,
classify the received at least one first image according to image supplying sources,
identify at least one image analysis model having an analysis type corresponding to each of the classified at least one first image from among a plurality of image analysis models of which the analysis type is different from each other,
process each of the classified at least one first image by applying the identified at least one image analysis model thereto, and
generate analysis results about the at least one first image obtained according to the processing of the received at least one first image, to correspond to the analysis type of the at least one image analysis model.

2. The server according to claim 1, further comprising:
a plurality of image receivers, which is configured to receive a plurality of the first images,
wherein the processor is configured to:
control the storage to store analysis results about the plurality of the first images generated according to processing of the received plurality of the first images.

3. The server according to claim 1, wherein the processor is configured to:
identify more than two image analysis models to be applied to the received at least one first image from among the plurality of image analysis models of which the analysis type is different from each other, based on the received at least one first image, and
apply the identified more than two image analysis models to the received at least one first image.

4. A server comprising:
a communicator, comprising circuitry, configured to communicate with an external apparatus; and
a storage configured to store analysis results about at least one first image to correspond to an analysis type of at least one image analysis model with respect to the at least one first image, the analysis results being obtained according to a processing of classifying the at least one first image according to image supplying sources, identifying at least one image analysis model having an analysis type corresponding to each of the classified at least one first image from among a plurality of image analysis models of which the analysis type is different from each other, and processing each of the classified at least one first image by applying the identified at least one image analysis model thereto; and
a processor configured to:
receive an inquiry including information about a second image from an external apparatus via the communicator,
identify an analysis type of at least one image analysis model for the second image included in the inquiry,
based on the analysis results stored in the storage, identify or generate information about an analysis result corresponding to the identified analysis type of the at least one image analysis model for the second image and the inquiry, and
transmit the information about the analysis result to the external apparatus.

5. The server according to claim 4, wherein the processor is configured to:
receive the inquiry from a plurality of external apparatuses via the communicator, and
transmit the generated information about the analysis result to each of the plurality of external apparatuses.

6. A display apparatus, comprising:
a display;
a user input;
a communicator, comprising circuitry, configured to communicate with an external apparatus, configured to classify at least one first image according to image supplying sources, identify at least one image analysis model having an analysis type corresponding to each of the classified at least one first image from among a plurality of image analysis models of which the analysis type is different from each other, process each of the classified at least one first image by applying the identified at least one image analysis model thereto, and generate analysis results about the at least one first image obtained according to the processing of the received at least one first image, to correspond to the analysis type of the at least one image analysis model; and
a processor configured to:
receive an inquiry including information about a second image via the user input,
transmit the inquiry to the external apparatus,
receive, from the external apparatus, information about an analysis result identified or generated based on the analysis results about the at least one first image and corresponding to an analysis type of at least one image analysis model for the second image included in the inquiry from among the analysis results generated in the external apparatus, and
control the display to display the received information about the analysis result.

7. The apparatus according to claim 6, wherein the processor is configured to transmit information about the analysis type of the at least one image analysis model for the second image corresponding to the inquiry including information about the second image, to the external apparatus.

8. A control method of a server, comprising:
receiving at least one first image from an external apparatus;
classifying the received at least one first image according to image supplying sources;
identifying at least one image analysis model having an analysis type corresponding to each of the classified at least one first image from among a plurality of image analysis models of which the analysis type is different from each other;
processing each of the classified at least one first image by applying the identified at least one image analysis model thereto; and
generating analysis results about the at least one first image obtained according to the processing of the received at least one first image, to correspond to the analysis type of the at least one image analysis model.

9. The method according to claim 8,
wherein the server comprises a plurality of image receivers, each of which is configured to receive a plurality of the first images,
wherein the method further comprises storing analysis results about the plurality of the first images generated according to processing of the received plurality of the first images.

10. The method according to claim 8, further comprising:
identifying more than two image analysis models to be applied to the received at least one first image from among the plurality of image analysis models of which the analysis type is different from each other, based on the received at least one first image, and
wherein the processing comprises applying the identified more than two image analysis models to the received at least one first image.

11. A control method of a server comprising:
storing analysis results about at least one first image to correspond to an analysis type of at least one image analysis model with respect to the at least one first image, the analysis results being obtained according to a processing of classifying the at least one first image according to image supplying sources, identifying at least one image analysis model having an analysis type corresponding to each of the classified at least one first image from among a plurality of image analysis models of which the analysis type is different from each other, and processing each of the classified at least one first image by applying the identified at least one image analysis model thereto;
receiving an inquiry including information about a second image from an external apparatus;
identifying an analysis type of at least one image analysis model for the second second image included in the inquiry;
based on the stored analysis results, identifying or generating information about an analysis result corresponding to the identified analysis type of the at least one image analysis model for the second image and the inquiry; and
transmitting the information about the analysis result to the external apparatus.

12. The method according to claim 11, wherein the receiving comprises receiving the inquiry from a plurality of external apparatuses, and wherein the transmitting comprises transmitting the generated information about the analysis result to each of the plurality of external apparatuses.

13. A control method of a display apparatus, comprising:
receiving an inquiry including information about a first image;
transmitting the inquiry to an external apparatus, configured to classify at least one second image according to image supplying sources, identifies at least one image analysis model having an analysis type corresponding to each of the classified at least one second image from among a plurality of image analysis models of which the analysis type is different from each other, process each of the classified at least one second image by applying the identified at least one image analysis model thereto, and generate analysis results about the at least one second image obtained according to the processing of the received at least one second image, to correspond to the analysis type of the at least one image analysis model;
receiving, from the external apparatus, information about an analysis result identified or generated based on the analysis results about the at least one second image and corresponding to an analysis type of at least one image analysis model for the first image included in the inquiry from among the analysis results generated in the external apparatus; and
displaying the received information about the analysis result.

* * * * *